United States Patent
Elliot et al.

(10) Patent No.: US 8,493,859 B2
(45) Date of Patent: Jul. 23, 2013

(54) METHOD AND APPARATUS FOR ADAPTIVE BANDWIDTH CONTROL WITH A BANDWIDTH GUARANTEE

(75) Inventors: Steven Elliot, Austin, TX (US); Gregory James Kudamik, Morrisville, NC (US); Christopher Victor Lazzaro, Austin, TX (US); Tranh K. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 12/132,236

(22) Filed: Jun. 3, 2008

(65) Prior Publication Data

US 2008/0259803 A1   Oct. 23, 2008

Related U.S. Application Data

(63) Continuation of application No. 11/256,260, filed on Oct. 21, 2005, now abandoned.

(51) Int. Cl.
*G01R 31/08* (2006.01)

(52) U.S. Cl.
USPC .......................................................... 370/235

(58) Field of Classification Search
USPC .................................................. 370/229–240
See application file for complete search history.

(56) References Cited

U.S. PATENT DOCUMENTS

| | | | |
|---|---|---|---|
| 5,692,130 A * | 11/1997 | Shobu et al. ................... | 709/229 |
| 6,088,578 A * | 7/2000 | Manning et al. ................ | 455/68 |
| 6,366,761 B1 * | 4/2002 | Montpetit ...................... | 455/12.1 |
| 6,578,075 B1 | 6/2003 | Nieminen et al. | |
| 7,035,211 B1 * | 4/2006 | Smith et al. ................... | 370/230 |
| 7,418,494 B2 | 8/2008 | Dahlin et al. | |
| 7,440,761 B2 | 10/2008 | Matsukura et al. | |
| 7,474,614 B2 | 1/2009 | Elliot et al. | |
| 7,558,271 B2 | 7/2009 | Elliot et al. | |
| 7,643,417 B2 | 1/2010 | Van Nieuwenhuizen | |
| 7,680,035 B2 | 3/2010 | Krishnan | |
| 7,688,746 B2 | 3/2010 | Hammarlund et al. | |
| 7,724,620 B2 | 5/2010 | Fuchiwaki | |

(Continued)

FOREIGN PATENT DOCUMENTS

| EP | 1077559 A | 2/2001 |
|---|---|---|
| JP | 2004088219 A | 3/2004 |

(Continued)

OTHER PUBLICATIONS

Venkataramani et al., "TCP Nice: A Mechanism for Background Transfers", ACM SIGOPS Operating Systems Review, vol. 36, Issue SI Winter 2002, pp. 1-15.

(Continued)

*Primary Examiner* — Kwang B Yao
*Assistant Examiner* — Tung Q Tran
(74) *Attorney, Agent, or Firm* — Yee & Associates, P.C.; Jeffrey S. LaBaw

(57) ABSTRACT

A computer implemented method, apparatus, and computer usable program code to monitor transmission of data to target. A determination is made as to whether the transmission of the data exceeds a threshold. The bandwidth used to transmit the data to the target is controlled using an adaptive bandwidth control process if the transmission of the data exceeds the threshold, wherein a minimum amount of bandwidth is guaranteed for the transmission of the data.

19 Claims, 7 Drawing Sheets

U.S. PATENT DOCUMENTS

| | | | |
|---|---|---|---|
| 7,796,517 B2 | 9/2010 | Chen et al. | |
| 7,869,395 B2 | 1/2011 | Wise et al. | |
| 7,885,188 B2 | 2/2011 | Joshi | |
| 7,953,113 B2 | 5/2011 | Elliot et al. | |
| 8,094,681 B2 | 1/2012 | Elliot et al. | |
| 8,125,910 B2 | 2/2012 | Shimonishi et al. | |
| 2004/0064577 A1 | 4/2004 | Dahlin et al. | |
| 2004/0219923 A1 | 11/2004 | Oses et al. | |
| 2005/0108444 A1* | 5/2005 | Flauaus et al. | 710/15 |
| 2005/0141554 A1* | 6/2005 | Hammarlund et al. | 370/468 |
| 2005/0259682 A1 | 11/2005 | Yosef et al. | |
| 2005/0286416 A1 | 12/2005 | Shimonishi et al. | |
| 2006/0026004 A1 | 2/2006 | Van Nieuwenhuizen | |
| 2006/0029037 A1 | 2/2006 | Chen et al. | |
| 2006/0233108 A1* | 10/2006 | Krishnan | 370/235 |
| 2007/0008884 A1 | 1/2007 | Tang | |
| 2007/0064577 A1 | 3/2007 | Fuchiwaki | |
| 2007/0076626 A1* | 4/2007 | Wise et al. | 370/252 |
| 2007/0091921 A1 | 4/2007 | Elliot et al. | |
| 2007/0091922 A1 | 4/2007 | Elliot et al. | |
| 2007/0091923 A1 | 4/2007 | Elliot et al. | |
| 2008/0240156 A1 | 10/2008 | Elliot et al. | |
| 2008/0247419 A1 | 10/2008 | Elliot et al. | |
| 2010/0061236 A1 | 3/2010 | Joshi | |
| 2010/0223395 A1 | 9/2010 | Elliot et al. | |
| 2012/0075993 A1 | 3/2012 | Elliot et al. | |

FOREIGN PATENT DOCUMENTS

| | | | |
|---|---|---|---|
| JP | 2004153505 A | 5/2004 | |
| JP | 2005184494 A | 7/2005 | |
| WO | 0249254 A2 | 6/2002 | |
| WO | 02 052768 A2 | 7/2002 | |

OTHER PUBLICATIONS

Brakmo et al., "TCP Vegas: New Technologies for Congestion Detection and Avoidance", Computer Communication Review, ACM, New York US., vol. 24, No. 4, Oct. 1994, pp. 24-25.

USPTO office action for U.S. Appl. No. 12/138,982 dated Apr. 12, 2010.

USPTO office action for U.S. Appl. No. 12/138,036 dated May 14, 2010.

USPTO office action for U.S. Appl. No. 12/138,036 dated Oct. 27, 2010.

China Patent office action for application 200710187004.5 dated Aug. 3, 2010.

USPTO office action for U.S. Appl. No. 12/138,982 dated Sep. 30, 2010.

Translation excerpt of JP office action Jan. 5, 2011 notice of reasons for rejection pp. 1-2.

JP office action for application 2008-536010 dated Jan. 5, 2011.

Translation excerpt of JP office action Dec. 21, 2010 notice of reasons for rejection pp. 1-2.

JP office action for application 2006-286657 dated Dec. 21, 2010.

JP office action dated Apr. 4, 2011.

USPTO Final office actin dated Jun. 16, 2011 regarding U.S. Appl. No. 12/138,036.

USPTO Notice of allowance dated Sep. 7, 2011 regarding U.S. Appl. No. 12/138,036.

USPTO Final office action dated Jun. 15, 2011 regarding U.S. Appl. No. 12/782,425.

Office Action, dated Aug. 21, 2008, regarding U.S. Appl. No. 11/256,259, 15 pages.

Notice of Allowance, dated Mar. 9, 2009, regarding U.S. Appl. No. 11/256,259, 4 pages.

Office Action, dated Oct. 3, 2008, regarding U.S. Appl. No. 11/256,260, 11 pages.

Response to Office Action, dated Jan. 5, 2009, regarding U.S. Appl. No. 11/256,260, 9 pages.

Final Office Action, dated Apr. 6, 2009, regarding U.S. Appl. No. 11/256,260, 5 pages.

Notice of Allowance, dated Aug. 26, 2008, regarding U.S. Appl. No. 11/256,261, 14 pages.

Appeal Brief, dated Mar. 25, 2011, regarding U.S. Appl. No. 12/138,036, 29 pages.

Notice of Allowance, dated Jan. 24, 2011, regarding U.S. Appl. No. 12/138,982, 6 pages.

Office Action, dated Dec. 27, 2010, regarding U.S. Appl. No. 12/782,425, 53 pages.

Appeal Brief, dated Nov. 10, 2011, regarding U.S. Appl. No. 12/782,425, 22 pages.

Notice of Allowance, dated Mar. 21, 2012, regarding U.S. Appl. No. 12/782,425, 7 pages.

Notice of Allowance, dated May 31, 2012, regarding U.S. Appl. No. 12/782,425, 9 pages.

USPTO Non Final Office Action, U.S. Appl. No. 13/306,860, Apr. 1, 2013, 29 pages.

* cited by examiner

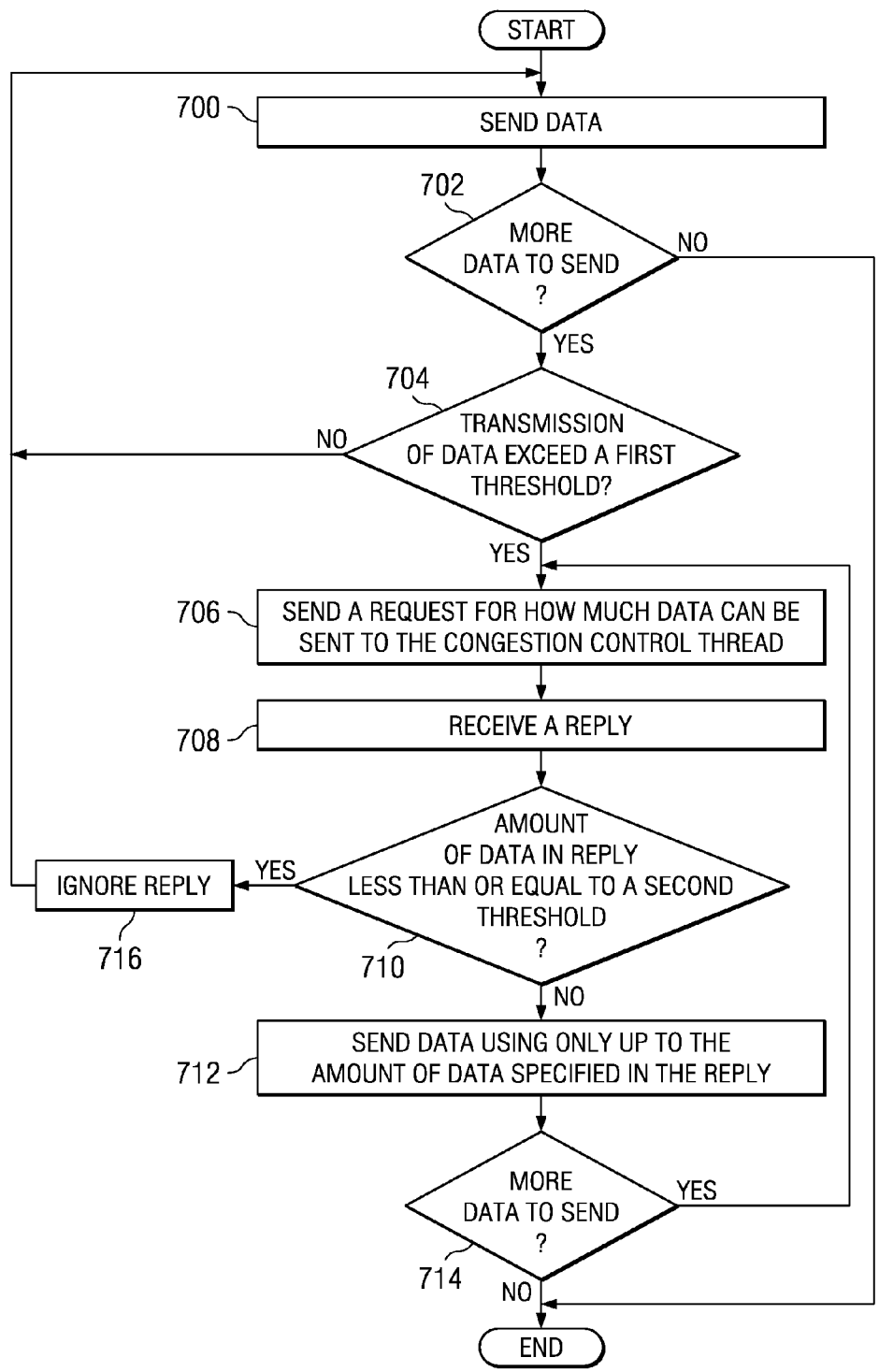

METHOD AND APPARATUS FOR ADAPTIVE BANDWIDTH CONTROL WITH A BANDWIDTH GUARANTEE

CROSS REFERENCE TO RELATED APPLICATIONS

The present invention is related to the following patent applications: entitled Method and Apparatus for Adaptive Bandwidth Control with User Settings, Ser. No. 11/256,261; and entitled Method and Apparatus for Adaptive Bandwidth Control with Defined Priorities for Different Networks, Ser. No. 11/256,259; filed even date hereof, assigned to the same assignee, and incorporated herein by reference.

This application is a continuation of application Ser. No. 11/256,260, filed Oct. 21, 2005, status pending.

BACKGROUND OF THE INVENTION

1. Field of the Invention

The present invention relates generally to an improved data processing system and in particular, to a computer implemented method and apparatus for transferring data. Still more particularly, the present invention relates to a computer implemented method, apparatus, and computer usable program code for adaptively controlling bandwidth used to transfer data.

2. Description of the Related Art

With the common use of networks and the Internet, communications in commerce has been revolutionized. Networks are commonly used to transfer data. Many distributed applications make use of large background transfers to improve the service quality. With these types of background transfers, users are not required to wait for these transfers to complete before performing other actions. A broad range of applications and services including, for example, data backup, prefetching, enterprise data distribution, Internet content distribution, and peer-to-peer storage employ background transfers. These and other types of applications increase network bandwidth consumption. Some of these services have potentially unlimited bandwidth demands in which the use of incrementally more bandwidth provides incrementally better service. One problem with these types of applications is that most networks have only a limited amount of bandwidth available for transferring data. Some applications perform critical functions while others are non-critical. Typically, background transfers are non-critical and may use all available bandwidth slowing down critical network traffic.

Adaptive bandwidth controls have been employed to automatically adapt to network conditions to reduce the impact to the network. Currently, different adaptive bandwidth control processes and algorithms are employed to control the amount of bandwidth used by different applications to avoid congestion. Currently available adaptive bandwidth control processes take into account the network conditions at the local interface level, either on the server or client computer and are unable to take into account other conditions that may exist in the transfer of data.

Therefore, it would be advantageous to have an improved computer implemented method, apparatus, and computer usable program code to adaptively control bandwidth usage in transferring data.

SUMMARY OF THE INVENTION

The present invention provides a computer implemented method, apparatus, and computer usable program code to monitor transmission of data to a target. A determination is made as to whether the transmission of the data exceeds a threshold. The bandwidth used to transmit the data to the target is controlled using an adaptive bandwidth control process if the transmission of the data exceeds the threshold, wherein a minimum amount of bandwidth is guaranteed for the transmission of the data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is flowchart of a process for a send thread in accordance with an illustrative embodiment of the present invention;

DETAILED DESCRIPTION OF THE PREFERRED EMBODIMENT

Figure 1:
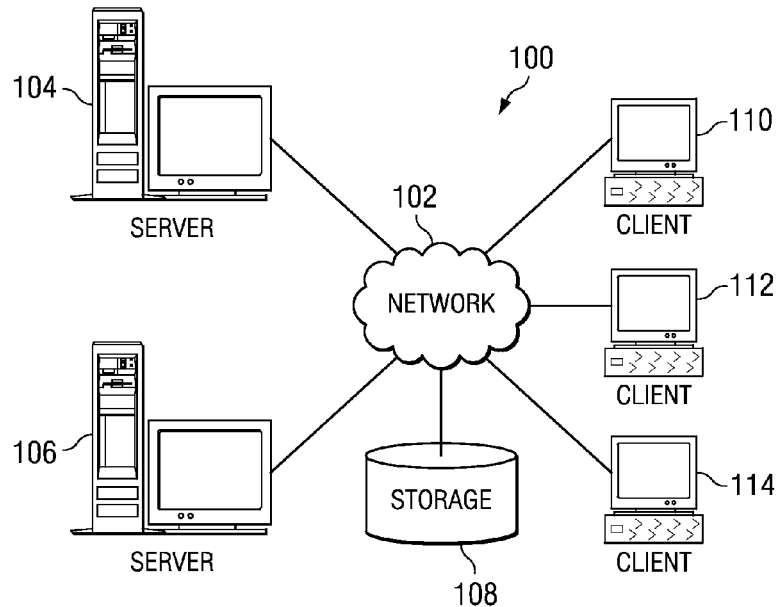
FIG. 1 is a pictorial representation of a network of data processing systems in which aspects of the present invention may be implemented.
Figure 2:
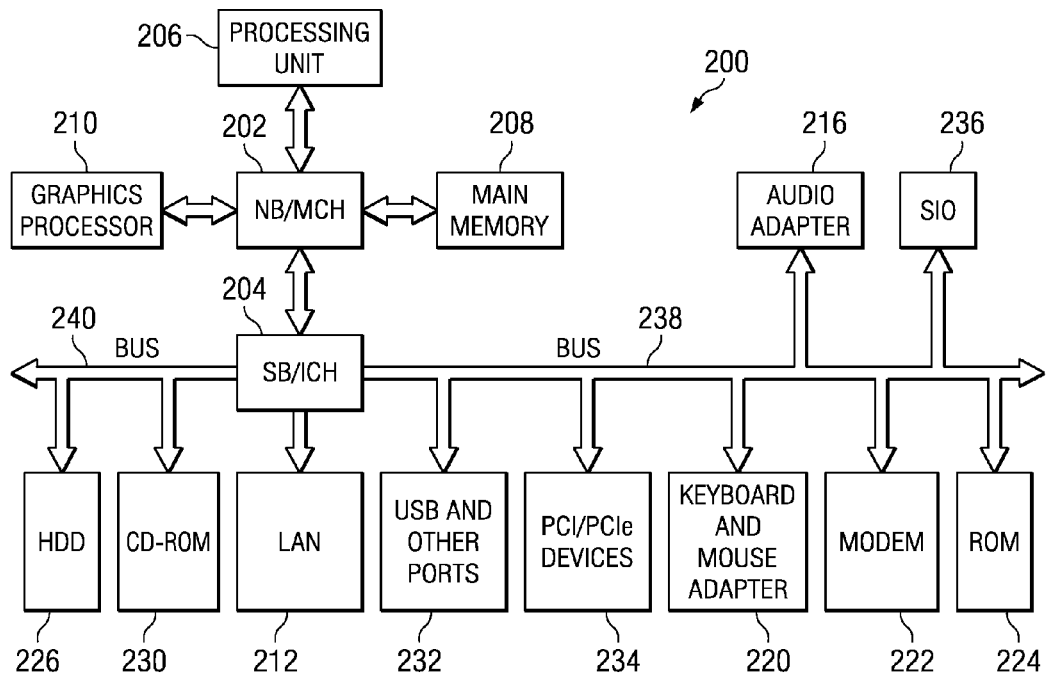
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for adaptively controlling bandwidth used in transferring data. The aspects of the present invention are able to adaptively control the transmission of data such that some minimum amount of bandwidth is guaranteed for transmitting the data over a network. In these examples, bandwidth is guaranteed by sending data using a normal high-impact TCP/

IP process versus a low-impact adaptive process. In other words, the data is sent as fast as the network will allow up to the minimum amount of bandwidth. In some cases, even with a guaranteed amount of bandwidth the amount of data that may be transferred may not reach that minimum amount due to network conditions.

The aspects of the present invention recognize that current adaptive distribution mechanisms for transferring data do not provide any amount of guarantee. The aspects of the present invention also provide some minimum level of bandwidth during which adaptive bandwidth control processes are not used. When the bandwidth exceeds that amount, adaptive control processes are used to determine what bandwidth may be applied at higher data transfer speeds or rates than the minimum amount. Although these illustrative examples are directed towards adaptive bandwidth control, the aspects of the present invention may be applied to any type of transfer of bulk data to one or more target data processing systems.

Figure 3:
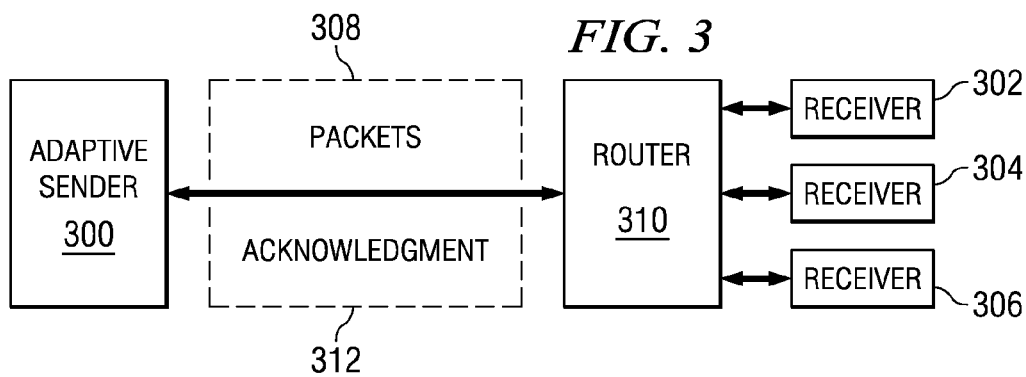
FIG. 3 is a diagram illustrating components used in adaptive bandwidth control in accordance with an illustrative embodiment of the present invention.

Turning now to FIG. 3, a diagram illustrating components used in adaptive bandwidth control is depicted in accordance with an illustrative embodiment of the present invention. In this example, adaptive sender 300 sends data to receivers 302, 304, and 306. The data is sent by sending packets 308 to a routing mechanism, such as router 310. Router 310 is a device that serves to route or send packets 308 to the appropriate receivers based on routing data found in packets 308. When router 310 is forced to process too many packets, it is referred to as a backlogged router. In other words, the backlog router is the router that has the most load or largest number of packets in its queue. There can be zero or more routers between a sender and a receiver. The sender is the source of packets and the receivers are the source of acknowledgements. As these receivers receive packets 308, they return acknowledgements 312 to adaptive sender 300. In this example, the acknowledgements are part of regular TCP/IP communication.

In these illustrative examples, adaptive sender 300 may be implemented as a process in a data processing system, such as server 104 in FIG. 1. Receivers 302, 304, and 306 are processes that may execute on a receiving device, such as clients 108, 110 and 112 in FIG. 1. In particular, these different processes may be implemented on a data processing system, such as data processing system 200 in FIG. 2.

Adaptive sender 300 tracks packets 308 sent to each receiver. The receipt of acknowledgements 312 also are tracked and are used to identify parameters, such as round trip time. Round trip time is the time from which a packet is sent until the acknowledgement is received. In this example, the round trip time is based on the perspective of adaptive sender 300.

Additionally, this information is used to identify blocks. A block begins when an arbitrary packet is sent; statistical data is kept for all of the packets in the block until the initial packet which began the block is acknowledged by the receiver. When the acknowledgement for the arbitrary packet is returned, adaptive sender 300 calculates the statistics for that block of packets. In other words, one or more packets may be present in a block depending on how many packets are sent before the acknowledgement for the arbitrary packet in the beginning of the block has been returned. Additionally, adaptive sender 300 also identifies a window. A window is the number of packets in the network that had been sent without receiving an acknowledgement.

Further, adaptive sender 300 also estimates the number of packets that are located in router 310. This information is determined using the current round trip time to calculate the expected number of unacknowledged packets versus the real number of unacknowledged packets. For example, if five packets should exist on a network because of current round trip times and eight unacknowledged packets are identified by adaptive sender 300, adaptive sender 300 can estimate that three packets are located on router 310.

Adaptive sender 300 controls the speed by increasing or decreasing the expected window size while attempting to keep a selected number of packets on router 310. A large window is more aggressive because router 310 spends more time in processing adaptive packets versus other network traffic. In this manner, adaptive sender 300 may tune an alpha and beta parameter for router 310. Alpha is an integer indicating the minimum number of packets in router 310 per connection before the window is increased by one packet. Beta is an integer that indicates the maximum number of packets in the backlog router per connection before the window is decreased by one packet. These parameters allow for small increases or decreases in speed by adjusting the window based on alpha and beta. Another parameter, threshold, allows a quick decrease in speed when 50 percent of the packets in a block meet the conditions of this threshold. In this example threshold is a configurable percentage of the way from base round trip time to maximum round trip time. In this illustrative example, adaptive sender 300 changes the rate that data is sent to end points or targets based on an adaptive bandwidth control process. In these examples, this control process is used for use in transferring data above some threshold level of data transfer. The threshold configuration and measurement of the data transfer may be performed in a number of different ways. For example, the measurement may be an amount of data transferred over some period of time or a percentage of the total amount of the link speed.

Figure 4:
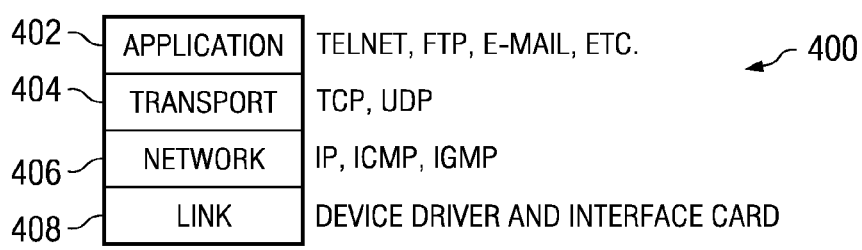
FIG. 4 is a diagram of a transmission control protocol/Internet protocol (TCP/IP) and similar protocols in accordance with an illustrative embodiment of the present invention.

Turning to FIG. 4, a diagram of a transmission control protocol/Internet protocol (TCP/IP) and similar protocols are depicted in accordance with an illustrative embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

In these illustrative examples, the aspects of the present invention are implemented in application layer 402 to adaptively control the transfer of data in a manner that allows for user settings to be input by a user. In this manner, the user may change different settings to control how packets are sent on the network for use in adaptive bandwidth control. By allowing user settings to be input from the application level, a user may make changes for different types of networks and different network conditions that are not typically taken into account by adaptive bandwidth control processes.

One setting that may be set by a user is a threshold level for the minimum amount of bandwidth that is to be used for the transfer of data. When the data transfer exceeds the threshold, adaptive bandwidth control processes are used for the higher rates of data transfer. In this manner, conditions other than those on the clients may be taken into account. For example, the aspects of the present invention allow a user to change settings based on an identification of factors, such as the number of hops in a path to the receiver and links in the path to the receiver that have large amount of traffic or congestion. Although the illustrative examples are implemented in application layer 402, the aspects of the present invention may be implemented in other layers, such as transport layer 404. The particular layer used may change depending on the particular implementation.

Figure 5:
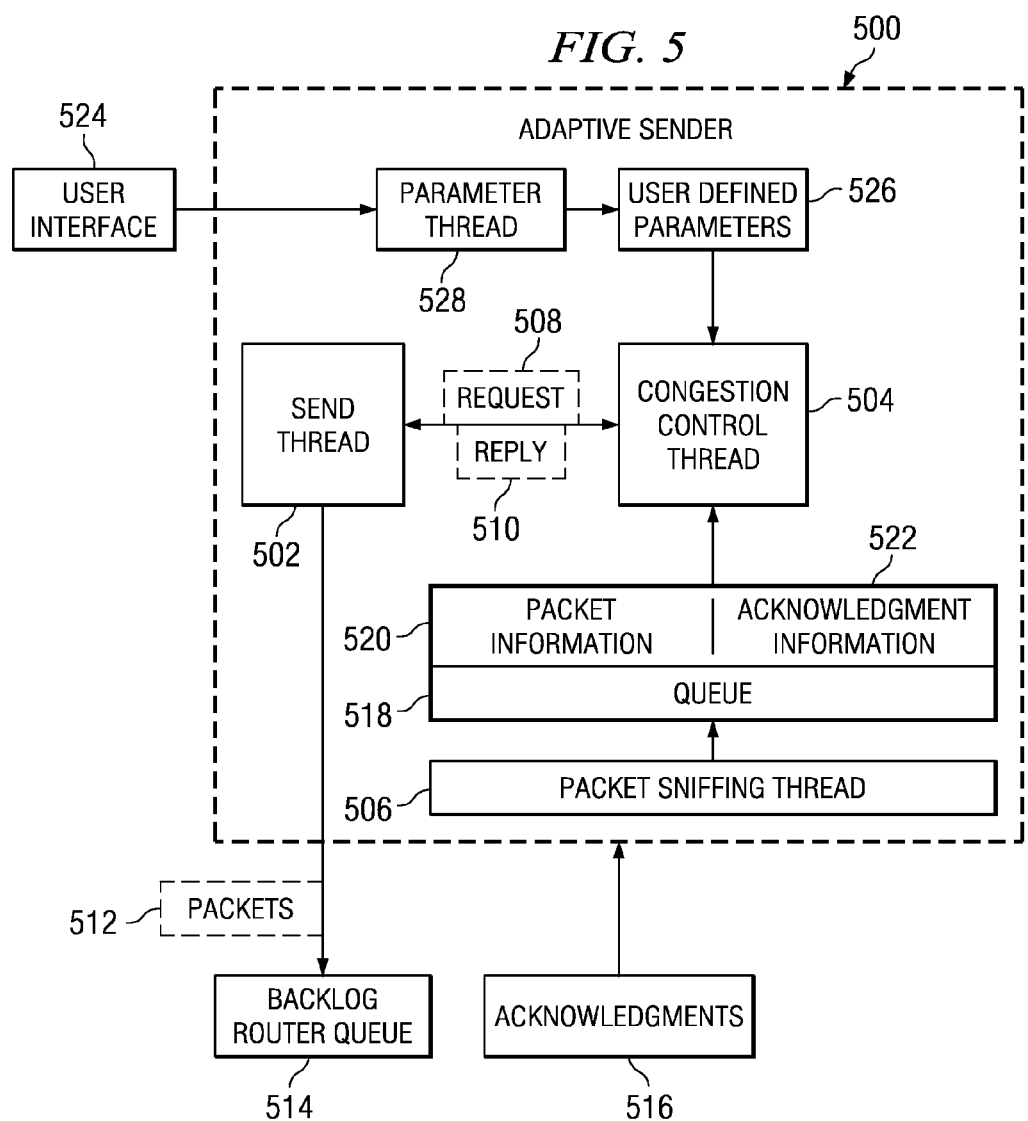
FIG. 5 is a diagram illustrating software processes and components used in providing adaptive bandwidth control in accordance with an illustrative embodiment of the present invention.

Turning now to FIG. 5, a diagram illustrating software processes and components used in providing adaptive bandwidth control is depicted in accordance with an illustrative embodiment of the present invention. In this example, adaptive sender 500 is a more detailed illustration of processes within adaptive sender 300 in FIG. 3. Adaptive sender 500 contains three threads in this illustrative example. Send thread 502, congestion control thread 504, and packet sniffing thread 506 are the components used to adaptively send data to one or more receivers. Send thread 502 is used to send data through making calls to a socket. A socket is a software object that connects an application to a network protocol, such as a TCP/IP protocol in a TCP/IP stack. Send thread 502 transfers data in packets 512. If the rate of transfer permitted by the connection or link exceeds a threshold or minimum level of bandwidth, send thread 502 sends request 508 to congestion control thread 504 to ask how much data may be sent by send thread 502. Congestion control thread 504 returns reply 510, telling how much data may be sent. Send thread 502 uses reply 510 to send packets 512 for transmission.

In using reply 510, if for some reason the data that is to be sent is less than the guaranteed amount or threshold level, send thread 502 ignores the reply and no longer requests this information from congestion control thread 504 until the minimum amount of bandwidth is again exceeded. These packets are stored in backlog router queue 514 until a backlog router routes the packets to their destination. Backlog router queue 514 is located on a backlog router, such as router 310 in FIG. 3. Acknowledgements 516 are returned to adaptive sender 500 when the packets are received. In this example, the process or logic for sending data based on the guaranteed amount is performed by send thread 502 for purposes of illustration. Of course, this particular process may be implemented within congestion control thread 504. In this type of implementation, send thread 502 will ask congestion control thread 504 every time as to how much data may be sent.

Congestion control thread 504 identifies the amount of data to be sent by performing an adaptive bandwidth control process. Congestion control thread 504 in these examples uses the adaptive bandwidth control process to adaptively identify transmission rates for transmitting data packets over a network in response to changes in network conditions. These network conditions include, for example, the amount of congestion on the network due to various other transmissions of data in addition to those being processed by the adaptive sender. In other words, the rate of speed at which data may be sent changes according to the network conditions. Congestion control thread 504 identifies different rates that speed up or slow down to maintain a minimal network impact based on the different parameters that are set by the user. This process uses information located in queue 518. In particular, packet sniffing thread 506 grabs packets and acknowledgements from the network and places packet information 520 and acknowledgement information 522 into queue 518. Packet sniffing thread 506 filters the packets and acknowledgements to place appropriate data needed by congestion control thread 504 into queue 518. Alternatively, the entire packets and acknowledgements may be placed into queue 518 for processing by congestion control thread 504. The information in queue 518 is used by congestion control thread 504 to identify parameters, such as a round trip time from when a packet was sent until the acknowledgement for the packet was received. Other parameters that may be identified and maintained by congestion control thread 504 from information in queue 518 include a block, a window, and the packets in the backlog router.

Further, the aspects of the present invention include user interface 524 which may be used to set user defined parameters 526. User interface 524 is provided by parameter thread 528. Typically, the parameters are set up when the adaptive process is first set up on a system. These parameters may be altered through user interface 524 and parameter thread 528. User defined parameters 526 are stored in a non-volatile memory, such as a disk. These parameters can be later read when the adaptive bandwidth process initiates. User interface 524 allows the user to select or input various parameters for use by congestion control thread 504 in performing adaptive bandwidth control processes.

In these illustrative examples, the aspects of the present invention allow a user to enter or select a threshold, which is used as a minimum level or speed for transfer of data without using adaptive control processes. The aspects of the present invention use a threshold for sending data to a destination or target. When the data transfer exceeds this threshold, adaptive bandwidth control processes are then initiated for use in transferring the data. If for some reason the adaptive bandwidth control process indicates that the amount of data transferred is less than the threshold, this indication is ignored by the process sending the data. In this manner, the aspects of the present invention provide adaptive bandwidth control in sending data with a guaranteed transfer rate. In these examples, other parameters that may be set comprise a threshold, a round trip time maximum change, beta, round trip time smoothing, and a maximum wait time. The round trip time maximum change is a parameter used to restrict the amount of change in the currently measured round trip time relative to the previous measured round trip time. The process tracks the current round trip time, the maximum round trip time and the base round trip time.

The congestion control thread tracks the round trip times on a per-socket basis and sequence. If one packet has a round trip time of ten and a second packet has a round trip time of twenty, then the second packet round trip time is limited by a round trip time maximum change value of one point five (1.5). Even though the real round trip time is twenty, the round trip time value is recorded as ten times one point five equals fifteen (10×1.5=15). Then, the subsequent packet may have a round trip time at the most of one point five times fifteen (1.5×15), the round trip time recorded for the second packet.

Networks typically have some amount of randomness. This parameter allows an adaptive bandwidth control process to ignore an overly large or overly small round trip time, but still allow for large round trip times if they occur often enough. This parameter allows the user to configure how much change is tolerated.

The round trip time smoothing parameter in these examples is an integer used to indicate how much the round trip time measurements should be smoothed by exponential decay. The exponential decay is performed by averaging the previous measurement. This parameter may help in cases in which the adaptive bandwidth control process behaves erratically by overcompensating for fluctuations in round trip time. The smoothing typically occurs before the maximum change parameter is taken into account.

The maximum wait time is a parameter that indicates what multiple of maximum round trip time a connection will wait to send before giving up and resetting. Sometimes acknowledgements may be lost on a network causing the sender to wait for a long period of time before sending additional data. This is a reset value to reset the process of adaptive bandwidth control if too much time has passed before data has been sent. With respect to the threshold parameter, when round trip times of packets are sent on a socket, the times tend to fall within a selected range. This situation is especially true when the network is idle.

The threshold is a percentage of the way from the minimum round trip time to the maximum round trip time. For example, a threshold of twenty percent means that the threshold is twenty percent of the way from the base round trip time to the maximum round trip time. Depending on the type of network, round trip times will have more or less variation. The different variations typically require different threshold values. For example, a well behaved local area network will have very little round trip time variation, allowing for a low threshold value. A wide area network will have higher round trip time variations. With this type of network, a higher threshold is required. This particular parameter is user configurable to take into account different types of networks that may be encountered in sending data. With respect to the threshold parameter, when round trip times of packets are sent on a socket, the times tend to fall within a selected range. This situation is especially true when the network is idle.

If the round trip time of a packet is slower than the threshold value, this packet is considered slow. If fifty percent of the packets in a block are considered to be slow, then the window may be cut in half, greatly reducing the speed of distribution. As a result, allowing for user configuration of this value allows for taking into account different network types and conditions.

Figure 6:
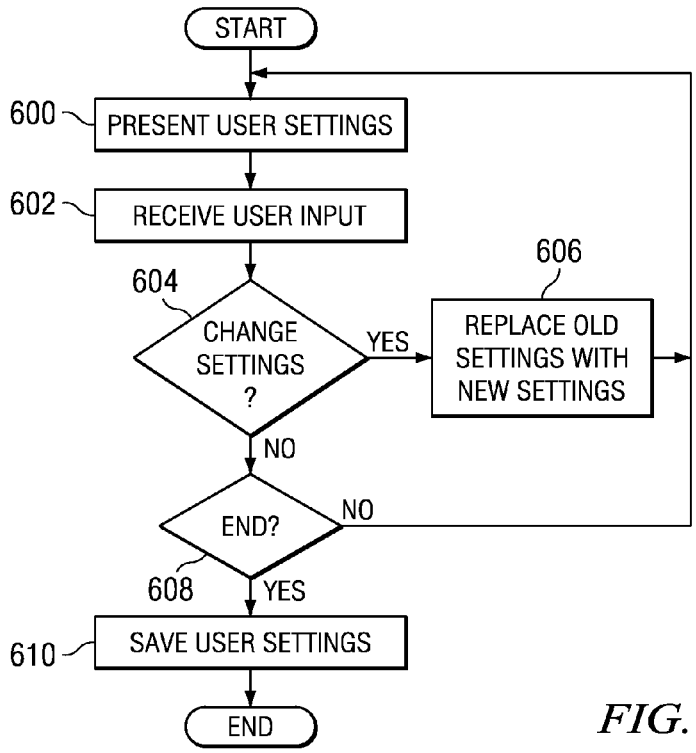
FIG. 6 is a flowchart of a process for configuring user settings for parameters in accordance with an illustrative embodiment of the present invention.

Turning now to FIG. 6, a flowchart of a process for configuring user settings for parameters is depicted in accordance with an illustrative embodiment of the present invention. The process illustrated in FIG. 6 may be implemented in send thread 502 in FIG. 5. This process is used to allow a user to define or change parameters used in adaptive bandwidth control. In these examples, the parameters are threshold, round trip time maximum change, round trip time smoothing, maximum wait time, and beta threshold.

The process begins by presenting user settings (step 600). These settings may be presented in a user interface, such as user interface 524 in FIG. 5. The process then receives user input (step 602). A determination is made as to whether the user input changes settings in the parameters (step 604). If the user input changes the settings, the old settings are replaced with the new settings (step 606). Thereafter, the process returns to step 600 to present these settings to the user.

With reference again to step 604, if the user input does not change settings, a determination is made as to whether the user input is to end the process of changing user settings (step 608). If the user input is not to end the process, the process returns to step 600. Otherwise, the user settings are saved (step 610) with the process terminating thereafter. These settings are saved as user defined parameters 526 in FIG. 5 in these examples.

Turning now to FIG. 7, a flowchart of a process for a send thread is depicted in accordance with an illustrative embodiment of the present invention. The process illustrated in FIG. 7 may be implemented in a send thread, such as send thread 502 in FIG. 5.

The process begins by sending data to be received (step 700). Thereafter, a determination is made as to whether more data is present to be sent to the receiver (step 702). If more data is present to be sent, a determination is made as to whether the transmission of data exceeds a first threshold (step 704). The determination in step 704 may be made numbered in many different ways. For example, the amount of data sent and the time needed to send the data may be used to determine whether the threshold has been exceeded. The threshold also may be a determination of whether more than some percentage of the speed for the connection is being used. This threshold is used to set a level over which adaptive bandwidth control is performed.

If the transmission of data exceeds the first threshold, the process sends a request as to how much data can be sent to the congestion control thread (step 706). Thereafter, the process receives a reply (step 708). This reply specifies the amount of data that may be sent to the receiver. Next, a determination is made as to whether the amount of data is less than or equal to a second threshold (step 710). This second threshold is used to set a minimum amount of bandwidth that is guaranteed for sending the data. The second threshold may be the same value as the first threshold depending on a particular implementation.

If the amount of data in the reply is not less than or equal to the second threshold, the data is sent using only up the amount of data specified in the reply (step 712). Next, a determination is made as to whether additional data is present to be sent (step 714). If addition data is not present, the process terminates.

Otherwise, the process returns step 706 to send another request to the congestion control thread. With reference again to step 710, if the amount of data in the reply is less than or equal to the second threshold, the reply is ignored (step 716) with the process returning to step 700 to send data. With reference again to step 702, if addition data is not present to be sent, the process terminates.

Figure 8:
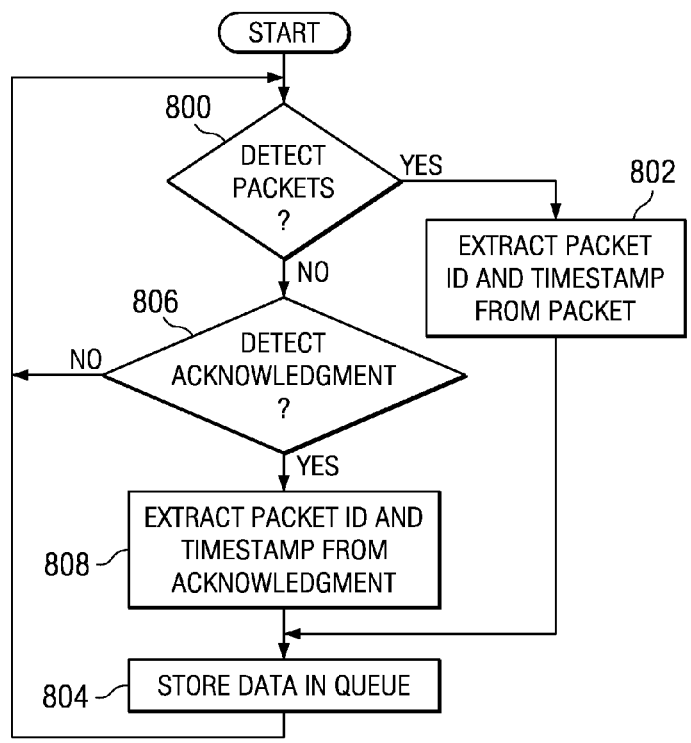
FIG. 8 is a flowchart of a process for a packet sniffing thread in accordance with an illustrative embodiment of the present invention.

Turning next to FIG. 8, a flowchart of a process for a packet sniffing thread is depicted in accordance with an illustrative embodiment of the present invention. The process illustrated in FIG. 8 may be implemented in packet sniffing thread 506 in FIG. 5.

The process begins by determining whether a packet has been detected (step 800). If a packet has been detected, the process extracts the packet identifier and the timestamp from the packet (step 802). The process then stores the data in a queue (step 804). This queue is accessible by a congestion control thread so that the data may be used in determining round trip times and performing adaptive bandwidth control processes.

With reference again to step 800, if a packet is not detected, a determination is made as to whether an acknowledgement has been detected (step 806). If an acknowledgement has not been detected, the process returns to step 800. If an acknowledgement has been detected in step 806, the packet identifier and the timestamp for the acknowledgement are extracted (step 808). The process then proceeds to step 804 as described above.

Figure 9:
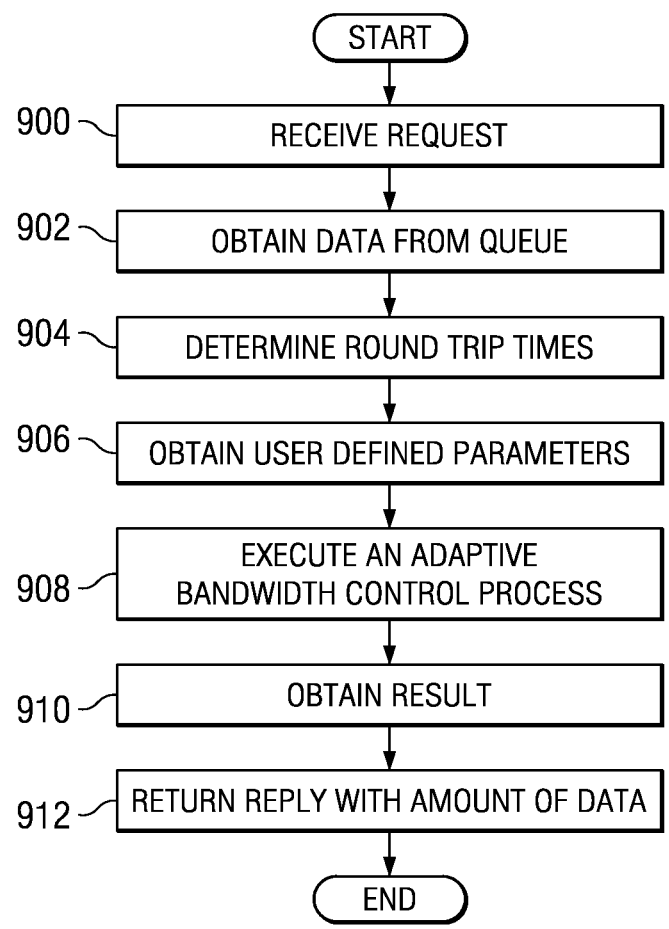
FIG. 9 is a flowchart of a process for a congestion control thread in accordance with an illustrative embodiment of the present invention.

Turning now to FIG. 9, a flowchart of a process for a congestion control thread is depicted in accordance with an illustrative embodiment of the present invention. In this example, the process illustrated in FIG. 9 may be implemented in congestion control thread 504 in FIG. 5.

The process begins by receiving a request from a send thread (step 900). This request requests an identification of how much data may be sent. Thereafter, data is pulled from the queue (step 902). This data includes arrival times and packet identifiers. Thereafter, round trip times are identified from the data in the queue (step 904). User defined parameters are then obtained (step 906). These parameters come from user defined parameters 526 in FIG. 5. Thereafter, the process executes an adaptive bandwidth control process (step 908). This process may be, for example, steps contained within the congestion control thread. Alternatively, the thread may call a function or external process in step 908. The process then obtains a result (step 910), and a reply is returned with the amount of data that may be sent (step 912) with the process terminating thereafter.

Figure 10:
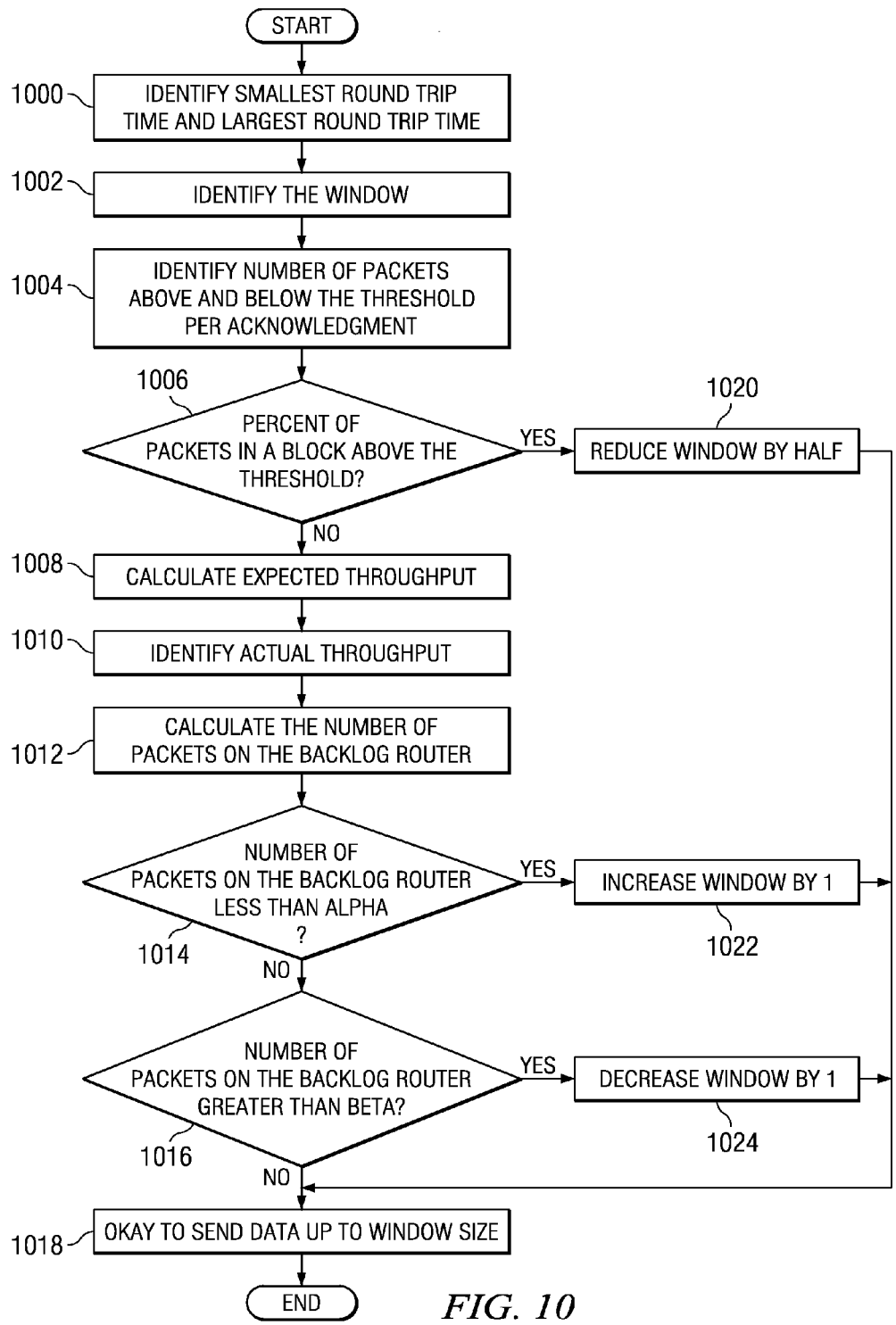
FIG. 10 is a flowchart of a process for performing adaptive bandwidth control in accordance with an illustrative embodiment of the present invention.

Turning next to FIG. 10, a flowchart of a process for performing adaptive bandwidth control is depicted in accordance with an illustrative embodiment of the present invention. The process depicted in FIG. 10 is a more detailed description of step 908 in FIG. 9.

The process begins by identifying the smallest round trip time and the largest round trip time (step 1000). Thereafter, the window is identified (step 1002). The process then identifies the number of packets above and below the threshold per acknowledgement (step 1004). Next, the process determines whether fifty percent of the packets in a block are above the threshold (step 1006). If fifty percent of the packets in a block are not above the threshold, the expected throughput is calculated step (step 1008). In step 1008, the expected throughput is calculated as follows:

$$E \leftarrow \frac{W}{minRTT}$$

E is the expected throughput, W is the window, and minRTT is the smallest round trip time seen from the round trip times obtained from the queue. Thereafter, the process identifies the actual throughput (step 1010). This actual throughput is identified using the following:

$$A \leftarrow \frac{W}{observedRTT}$$

A is the actual throughput, W is the window, and observedRTT is the value that is measured using the difference in the time from when the packet is sent and when the acknowledgement is received. As a result, the expected throughput is based on the minimum round trip time because an expectation is present that on an idle network the minimum round trip time is always the result of sending a packet. The actual throughput is based on the current network conditions in which the current round trip time is larger than the minimum round trip time. In these examples, minimum round trip time is the same as the base round trip time. The process then calculates the number of packets on the backlog router (step 1012). The actual number of packets is estimated using the following:

$$Diff \leftarrow (E-A) \cdot minRTT$$

Diff is the number of packets on the backlog router, E is the expected throughput, A is the actual throughput, and minRTT is the smallest round trip time seen.

Next, a determination is made as to whether the number of packets on the backlog router is less than alpha (step 1014). As described above, alpha is an integer that indicates the numeral number of packets that should be present in a backlog router per connection before the window is increased by one packet. If the number of packets on the backlog router is less than alpha, the process increments the window by one (step 1022). Thereafter, the process indicates that it is okay to send data up to the window size (step 1018) with the process terminating thereafter.

With reference again to step 1014, if the number of packets on the backlog router is not less than alpha, a determination is made as to whether the number of packets is greater than beta (step 1016). If the number of packets is greater than beta, the window size is decreased by one (step 1024). The process then proceeds to step 1018 as described above. Otherwise, the process proceeds to step 1018 without changing the window size.

With reference back to step 1006, if fifty percent of the packets in a block are above the threshold, the window is reduced by one half (step 1020). The process then proceeds to step 1018 as described above.

The process illustrated in FIG. 10 above is based on modifications to currently available bandwidth control algorithms, such as the Nice algorithm described in Venkataramani et al., "TCP Nice: A Mechanism for Background Transfers", ACM SIGOPS Operating Systems Review, Vol. 36, Issue SI Winter 2002, pp. 1-15., which is incorporated herein by reference.

NICE_FAST_RETURN—When set the fast start phase is exited upon the first failed send( ) with an errno of EWOULDBLOCK. This should minimize the amount of time spent in fast start mode, which does not yield to the gateway, since filling the outgoing queue of the socket should be very fast. Default is set.

NICE_INTERFACE—The interface (network card identifier) that is to be used by nice. At this time, adaptive bandwidth control process is not able to dynamically determine the correct interface. So, the interface needs to be set manually if it is not the first active interface. Typically this would be set to things like "eth1". Default is unset.

NICE_MAX_MULT—A floating point number that specifies a minimum value for maxRTT as a multiple of baseRTT.

When set it should help prevent unreasonably low values for maxRTT as well as the low throughput that tends to go along with that. Default is 0.0.

NICE_MIN_MSS—An integer that indicates the minimum MSS to be used. In the interest of efficiency lower values provided by the operating system are ignored in favor of NICE_DEFAULT_MSS. Default is 1000.

NICE_MIN_PACKET—An integer that specifies the minimum amount of data that should be sent at a single time. This is different than NICE_MIN_SEND in that if ok_to_send is less than the value specified it is set to 0. This is to avoid a situation where the congestion control thread keeps telling the send thread to send very small values like 1 byte. By setting this value to 10, the congestion control thread would wait until at least 10 bytes may be sent (returning 0 until calculations specify 10). Default is 0.

NICE_MIN_SEND—An integer that specifies the minimum value of ok_to_send, which means that the congestion control thread will always tell the send thread to send at least this amount of data. By setting this to 10 then even if adaptive calculations specify 3 congestion control thread will return 10. Default is 0.

NICE_NANO_FIXED—An integer that specifies the number of micro seconds that the internal callback function, select_delay( ), is to sleep when used.

NICE_NANO_FIXED has no effect when the callback is set to something other than select_delay( ). When not set, the delay is dynamically calculated based on how long it should take for there to be enough room to send a packet as indicated by the throughput of the last block (determined by the RTT of the fastest packet in the last block and the size of the block). When set to 1234 nanosleep( ) is not called: not set—Delay is calculated dynamically 0—nanosleep( ) is called with a value of 0, which may be a delay as long as 10 ms on some systems 1234—Do not call nanosleep( ) other—Call nanosleep( ) with the number of microseconds specified default is 0.

NICE_PCAP_TIMEOUT—An integer that indicates how long the operating system should wait before returning with a list of packets captured. This variable has no effect on Linux systems since Linux systems only wait until one packet is available regardless of how long it takes. On systems where this variable has an effect, such as Solaris, there is a trade-off between getting accurate RTTs when the time-out is set low and wasting CPU time when the network is idle. Default is 10 ms (the lowest supported value on Solaris).

NICE_QUEUE_LIMIT—The integer that specifies the maximum length of the queue of packets written to by the sniff thread that is read from by the cong thread. The longer the queue the less responsive nice is as the cong thread is acting on information that is delayed by however long it takes for packets to work their way through the queue. Default is 10.

NICE_RTT_MAX_CHANGE—An integer that indicates the maximum amount that the base and max RTTs are allowed to change relative to the previous value. When set, adaptive bandwidth control process should be more tolerant of spurious extreme RTT values. Default is 1.5.

NICE_RTT_MIN_STDS—An integer that indicates the minimum number of standard deviations above the base RTT RTTs will have to be considered above the base RTT. Default in 0.

NICE_RTT_SMOOTHING—An integer that indicates how much the RTT (Round Trip Time) measurements should be smoothed by exponential decay, which is done by averaging with the previous measurement. Setting this may help in cases where nice behaves erratically by over compensating for each fluctuation in RTT. Default is 50.

NICE_RTT_STD_SMOOTH—An integer that is similar to NICE_RTT_SMOOTHING, but for standard deviations. The standard deviation is based on a weighted average of recent RTT measurements. Default is 0.

NICE_SEND_RTX_Q—When set the sending thread will add or update an estimate of each outgoing packet to the rtx_q which is used to calculate RTTs. The sending thread has the advantage that it does not drop packets, but its estimate of the outgoing time may be inaccurate. Default is set.

NICE_THROUGHPUT_AVG—An integer that indicates how many of the most recent packets are to be included in the throughput calculation. Larger values should result in more accurate throughput calculations, but at the cost of being less responsive. Default is 20.

NICE_THROUGHPUT_START—An integer that indicates the minimum number of packets that must be sent before the throughput calculations are begun. This is to account for the slow link queue initially being empty, so the throughput during the early portion of the socket may not be typical of the socket and should be ignored. Default is 100.

NICE_WAIT_BASE—An integer that indicates what multiple of v_baseRTT (global minimum RTT) a connection will wait to send before giving up and resetting snd_nxt and snd_una. The timeout calculated is added to that for NICE_WAIT_MAX. Default is 0.

NICE_WAIT_MAX—An integer that indicates what multiple of v_maxRTT (global maximum RTT) a connection will wait to send before giving up and resetting. Default is based on priority.

Thus, the aspects of the present invention provide a computer implemented method, apparatus, and computer usable program code for adjusting the rate of data transfers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling transmission of data, the computer implemented method comprising:
   monitoring, by a computer, transmission of data to a target;
   determining, by the computer, whether the transmission of the data exceeds a threshold;
   responsive to determining that the transmission of the data exceeds the threshold, the computer sending a request to an adaptive bandwidth control process requesting an amount of data that can be sent to the target;
   the computer receiving a reply from the adaptive bandwidth control process that specifies the amount of data that can be sent to the target; and
   responsive to receiving the reply from the adaptive bandwidth control process that specifies the amount of data that can be sent to the target, the computer sending the data to the target using only up to the amount of data that can be sent to the target as specified in the reply from the adaptive bandwidth control process, wherein a minimum amount of bandwidth is guaranteed for the transmission of the data.

2. The computer implemented method of claim 1, wherein the determining step comprises:
   identifying a transmission speed of the data; and
   comparing the transmission speed to the threshold.

3. The computer implemented method of claim 1, wherein the determining step comprises:
   identifying a percentage of total line speed used to transmit the data to the target; and
   comparing the percentage of total line speed used to the threshold.

4. A computer implemented method for controlling transmission of data, the computer implemented method comprising steps implemented by a computer of:
   monitoring, by the computer, transmission of data to a target;
   determining, by the computer, whether the transmission of the data exceeds a threshold;
   controlling, by the computer, the bandwidth used to transmit the data to the target using an adaptive bandwidth control process if a parameter associated with the transmission of the data exceeds the threshold, wherein a minimum amount of bandwidth is guaranteed for the transmission of the data;
   determining, by the computer, whether the transmission of data is less than or equal to a second threshold; and
   ceasing use of the adaptive bandwidth control process if the transmission of the data is less than or equal to a second threshold.

5. The computer implemented method of claim 4, further comprising using the adaptive bandwidth control process if the transmission of the data is greater than the second threshold.

6. The computer implemented method of claim 1, wherein the controlling step is implemented in an application layer of a TCP/IP protocol.

7. The computer implemented method of claim 1, wherein the controlling step is implemented in a transport layer of a TCP/IP protocol.

8. A computer program product comprising:
   a non-transitory computer readable storage medium embodied with computer usable program code for adaptively controlling transmission of data, the computer program product including:
   computer usable program code for monitoring transmission of data to target;
   computer usable program code for determining whether the transmission of the data exceeds a threshold;
   computer usable program code for controlling the bandwidth used to transmit the data to the target using an adaptive bandwidth control process if a parameter associated with the transmission of the data exceeds the threshold;
   computer usable program code for determining whether the transmission of data is less than or equal to a second threshold; and
   computer usable program code for ceasing use of the adaptive bandwidth control process if the transmission of the data is less than or equal to a second threshold, wherein a minimum amount of bandwidth is guaranteed for the transmission of the data.

9. The computer program product of claim 8, wherein the computer usable program code for determining whether the transmission of the data exceeds a threshold comprises:
   computer usable program code for identifying a transmission speed of the data; and
   computer usable program code for comparing the transmission speed to the threshold.

10. The computer program product of claim 8, wherein the computer usable program code for determining whether the transmission of the data exceeds a threshold comprises:
    computer usable program code for identifying a percentage of total line speed used to transmit the data to the target; and
    computer usable program code for comparing the percentage of total line speed used to the threshold.

11. The computer program product of claim 8, further comprising computer usable program code for using the adaptive bandwidth control process if the transmission of the data is greater than the second threshold.

12. The computer program product of claim 8, wherein the computer usable program code for controlling the bandwidth used to transmit the data to the target using an adaptive bandwidth control process if the transmission of the data exceeds the threshold, wherein a minimum amount of bandwidth is guaranteed for the transmission of the data is implemented in an application layer of a TCP/IP protocol.

13. The computer program product of claim 8, wherein the computer usable program code for controlling the bandwidth used to transmit the data to the target using an adaptive bandwidth control process if the transmission of the data exceeds the threshold, wherein a minimum amount of bandwidth is guaranteed for the transmission of the data is implemented in a transport layer of a TCP/IP protocol.

14. A data processing system comprising:
a bus;
a communications unit connected to the bus;
a memory connected to the bus, wherein the storage device includes a set of computer usable program code; and
a processor unit connected to the bus, wherein the processor unit executes the set of computer usable program code to monitor transmission of data to target; determine whether the transmission of the data exceeds a threshold; control the bandwidth used to transmit the data to the target using an adaptive bandwidth control process if a parameter associated with the transmission of the data exceeds the threshold; determine whether the transmission of data is less than or equal to a second threshold; and cease use of the adaptive bandwidth control process if the transmission of the data is less than or equal to a second threshold, wherein a minimum amount of bandwidth is guaranteed for the transmission of the data.

15. The data processing system of claim 14, wherein the processor unit further executes the computer usable program code to identify a transmission speed of the data; and compare the transmission speed to the threshold.

16. The data processing system of claim 14, wherein the processor unit further executes the computer usable program code to identify a percentage of total line speed used to transmit the data to the target; and compare the percentage of total line speed used to the threshold.

17. The data processing system of claim 14, wherein the processor unit further executes the computer usable program code to use the adaptive bandwidth control process if the transmission of the data is greater than the second threshold.

18. The data processing system of claim 14, wherein the processor unit further executes the computer usable program code to control the bandwidth used to transmit the data to the target using an adaptive bandwidth control process if the transmission of the data exceeds the threshold, wherein a minimum amount of bandwidth is guaranteed for the transmission of the data is implemented in an application layer of a TCP/IP protocol.

19. A computer implemented method for controlling transmission of data, the computer implemented method comprising steps implemented by a computer of:
monitoring a transmission of a data packet to a target;
extracting data and a plurality of parameters from the data packet, wherein the extracted data and the plurality of parameters are stored in a memory of a data processing system;
determining whether a roundtrip time of the data packet exceeds a threshold value;
responsive to determining that the roundtrip time of the data packet exceeds the threshold, sending a request to a congestion control process requesting an indication of an amount of data that can be transmitted to the target;
receiving a reply comprising a value indicating the amount of data that can be transmitted to the target;
determining whether the amount of data is less than or equal to a minimum amount of bandwidth that is guaranteed for the transmission of the data packet;
responsive to determining that the transmission of data is not less than or equal to the minimum amount of bandwidth that is guaranteed for the transmission of the data packet, sending the amount of data indicated in the reply using an adaptive bandwidth control process; and
responsive to determining that the amount of data is less than or equal to the minimum amount of bandwidth that is guaranteed for the transmission of the data packet, sending the data packet without using the adaptive bandwidth control process.

* * * * *